United States Patent
Sanghavi et al.

(10) Patent No.: US 7,334,201 B1
(45) Date of Patent: Feb. 19, 2008

(54) METHOD AND APPARATUS TO MEASURE HARDWARE COST OF ADDING COMPLEX INSTRUCTION EXTENSIONS TO A PROCESSOR

(75) Inventors: Jagesh Sanghavi, Cupertino, CA (US); Eliot Gerstner, Mountain View, CA (US)

(73) Assignee: Tensilica, Inc., Santa Clara, CA (US)

( * ) Notice: Subject to any disclaimer, the term of this patent is extended or adjusted under 35 U.S.C. 154(b) by 232 days.

(21) Appl. No.: 10/884,391

(22) Filed: Jul. 2, 2004

(51) Int. Cl.
*G06F 17/50* (2006.01)

(52) U.S. Cl. .............................................. 716/4; 716/5
(58) Field of Classification Search ............... 716/2, 716/4–6
See application file for complete search history.

(56) References Cited

U.S. PATENT DOCUMENTS

| | | | |
|---|---|---|---|
| 6,470,478 B1 * | 10/2002 | Bargh et al. ................... | 716/4 |
| 6,477,683 B1 * | 11/2002 | Killian et al. .................. | 716/1 |
| 6,708,912 B2 * | 3/2004 | Bascom et al. ............. | 241/295 |
| 6,760,888 B2 * | 7/2004 | Killian et al. .................. | 716/1 |
| 7,020,854 B2 * | 3/2006 | Killian et al. .................. | 716/1 |
| 7,036,106 B1 * | 4/2006 | Wang et al. .................. | 716/18 |
| 7,065,719 B2 * | 6/2006 | Nakajima ....................... | 716/1 |
| 7,203,912 B2 * | 4/2007 | Moona et al. ................. | 716/3 |
| 2004/0073882 A1 * | 4/2004 | Osann, Jr. ..................... | 716/16 |

\* cited by examiner

*Primary Examiner*—Jack Chiang
*Assistant Examiner*—Binh Tat
(74) *Attorney, Agent, or Firm*—Pillsbury Winthrop et al.

(57) ABSTRACT

An apparatus, method, and computer-readable media that provide fast and accurate prediction of the hardware cost of logic to extend a processor. Aspects of the invention enable designers to explore instruction set alternatives at the architectural level without completing a lengthy implementation flow. Embodiments may use existing standard cell libraries and EDA tools to obtain the cost of parameterized building blocks, to build components of a microprocessor such as instruction decoder, register files, and data path execution units. The cost of an application specific microprocessor is derived from the cost of each of its structural components.

26 Claims, 12 Drawing Sheets

US 7,334,201 B1

METHOD AND APPARATUS TO MEASURE HARDWARE COST OF ADDING COMPLEX INSTRUCTION EXTENSIONS TO A PROCESSOR

BACKGROUND

1. Field of the Invention

Aspects of the present invention relate in general to an apparatus, system and method of microprocessor design. Further aspects relate to the design of processors augmented with application specific instructions, and include an apparatus, method, and computer-readable medium capable of fast and accurate measurement of the hardware cost of adding complex instructions to a microprocessor.

2. Background of the Invention

The programmability provided by a processor makes it a preferred platform for a range of applications such as desktop computing, digital photography, and mobile telephony. The programmability results in amortization of the non-recurring engineering cost, ability to provide value added services, and ability to evolve the product in the presence of changing standards. Unfortunately, the programmability offered by a general purpose, fixed instruction set processor is either inadequate to meet the performance requirement or wasteful of hardware. This is especially true for embedded applications such as digital photography and mobile telephony that have application-specific processing requirements.

Application-specific processors are able to deliver orders of magnitude increase in performance and reduce the hardware cost compared to a fixed instruction set processor. U.S. Pat. No. 6,477,683, granted to Killian et al., describes an automated processor generation system for designing a configurable processor. The engineering effort and methodology to discover, describe, and design processor extension and associated software is presented by A. Wang et al. in "Hardware/Software Instruction Set Configurability for System-on-Chip Processors" in the proceedings of Design Automation Conference, 2001. The existing approaches have focused on the software aspects such as: analysis of target application to identify code sections to optimize the instruction set; generation of software development tools for optimized instruction set; and improvement of processor cycle count performance after addition of new instructions. The existing approaches generates register-transfer level hardware description that decodes and executes new instructions, however, it relies on existing electronic design automation (EDA) tools to perform logical and physical design of the register-transfer description to implement the hardware in a standard cells-based integrated circuit silicon.

The hardware design iteration 100 for application-specific processors is shown in FIG. 1. A system architect profiles the application code to identify performance critical code sections. Next, the system architect designs new instructions, act 102, using an instruction extension language. The instruction extension description is translated into a synthesizable register transfer level hardware description, act 106, by a configurable processor generator 104. The register-transfer description is converted into a standard cells-based hardware description 108 using EDA tools including a standard cell library 10, act 110. The process of converting the register-transfer description into a standard cells-based description is very time consuming and resource intensive. If the measured hardware cost of the standard cells-based description does not meet the required specification at 110, the whole process of instruction definition, register-transfer level hardware generation, and hardware implementation is repeated. The turnaround time for hardware implementation is on the order of hours to days. Since the process of hardware cost determination is very lengthy, it limits the amount of exploration to determine the optimal instruction set extension. The limitation of the existing approach is that the hardware cost determination relies on completing the implementation, a slow process that prevents rapid exploration at the architectural-level.

DETAILED DESCRIPTION

What is needed is an apparatus, method, and computer-readable medium capable of accurately estimating the cost of hardware to augment a processor with new instructions.

The design of an extensible processor may be compared to architecting a single-family home. The prior art for the extensible processor design is like constructing the home by taking into account all the details to estimate the cost; given the degree of automation in electronic design, the amount of effort is perhaps more like creating all the detailed blueprints to predict the cost. This is a time and resource intensive task that limits the amount of architectural exploration that may be performed. The approach presented here allows a system architect to truly design at the architecture level with full confidence in the quality of cost estimates. The cost estimator is able to predict accurately by characterizing the cost of parameterized, standardized building blocks.

One aspect of the invention is enabling designers to explore instruction set alternatives at the architectural level without completing a lengthy implementation flow. Another aspect of the present invention is the use of existing standard cell libraries and EDA tools to obtain the cost of parameterized building blocks, which are used to build components of a microprocessor such as instruction decoder, register files, and data path execution units. The cost of an application specific microprocessor is derived from the cost of each of its structural components.

Embodiments of the present invention enable designers to estimate microprocessor hardware design costs quickly. The turnaround time is on the order of seconds to minutes for processor extensions with several hundred thousand gates that would otherwise require hours to days to complete the hardware implementation. Moreover, embodiments produce results with high accuracy. The method embodiments may use parameterized, standardized design modules, the cost of which may be determined by using existing standard cell libraries and EDA tools.

In some embodiments, knowledge of processor microarchitecture for configurable execution units helps identify components of the total hardware cost. Each micro-architectural unit may be successively refined until a representation is obtained in terms of parameterized, standardized design modules. The reliance on structural information minimizes the errors.

Figure 1:
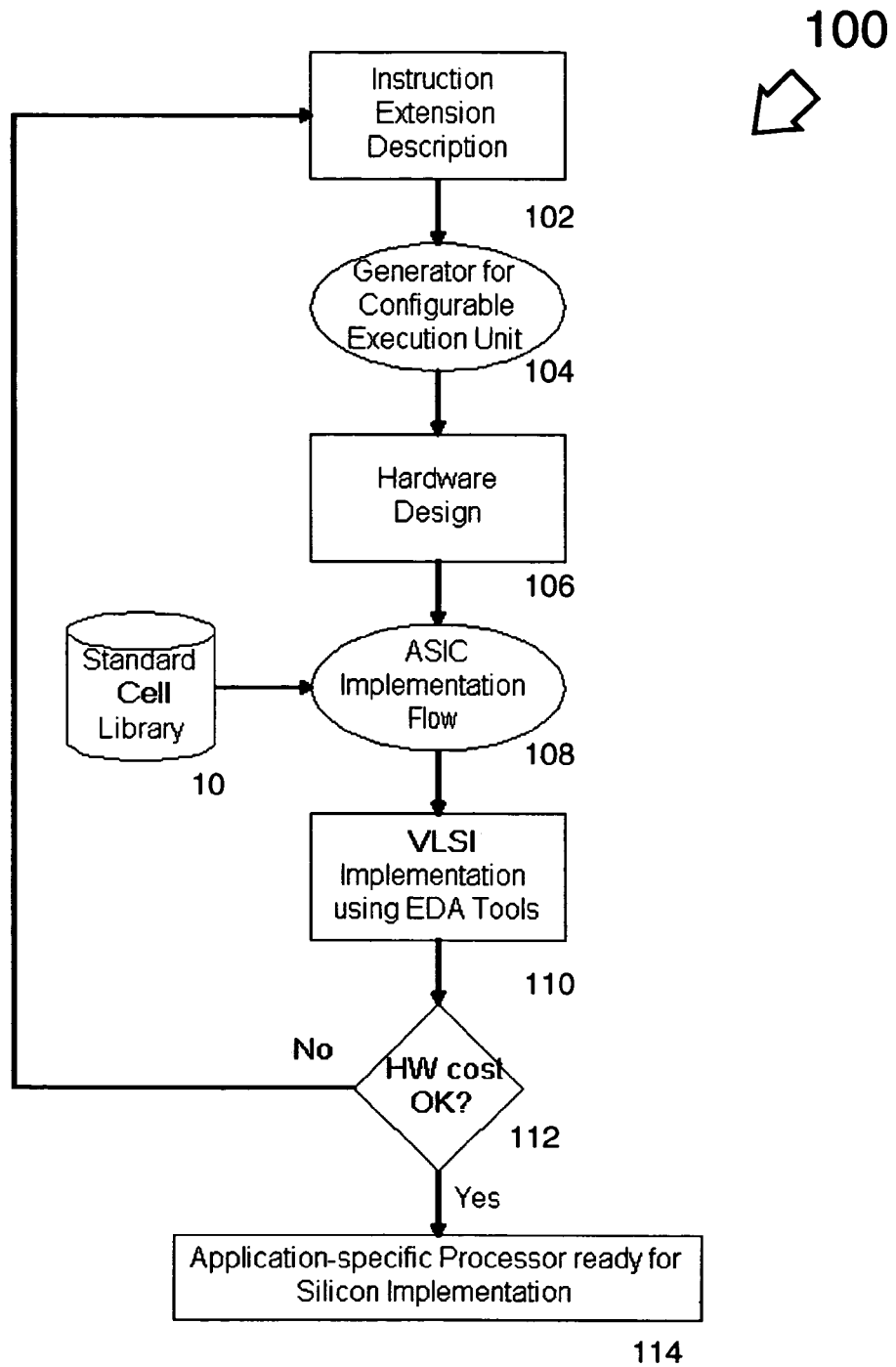
FIG. 1 illustrates a microprocessor design flow of the PRIOR ART.
Figure 2:
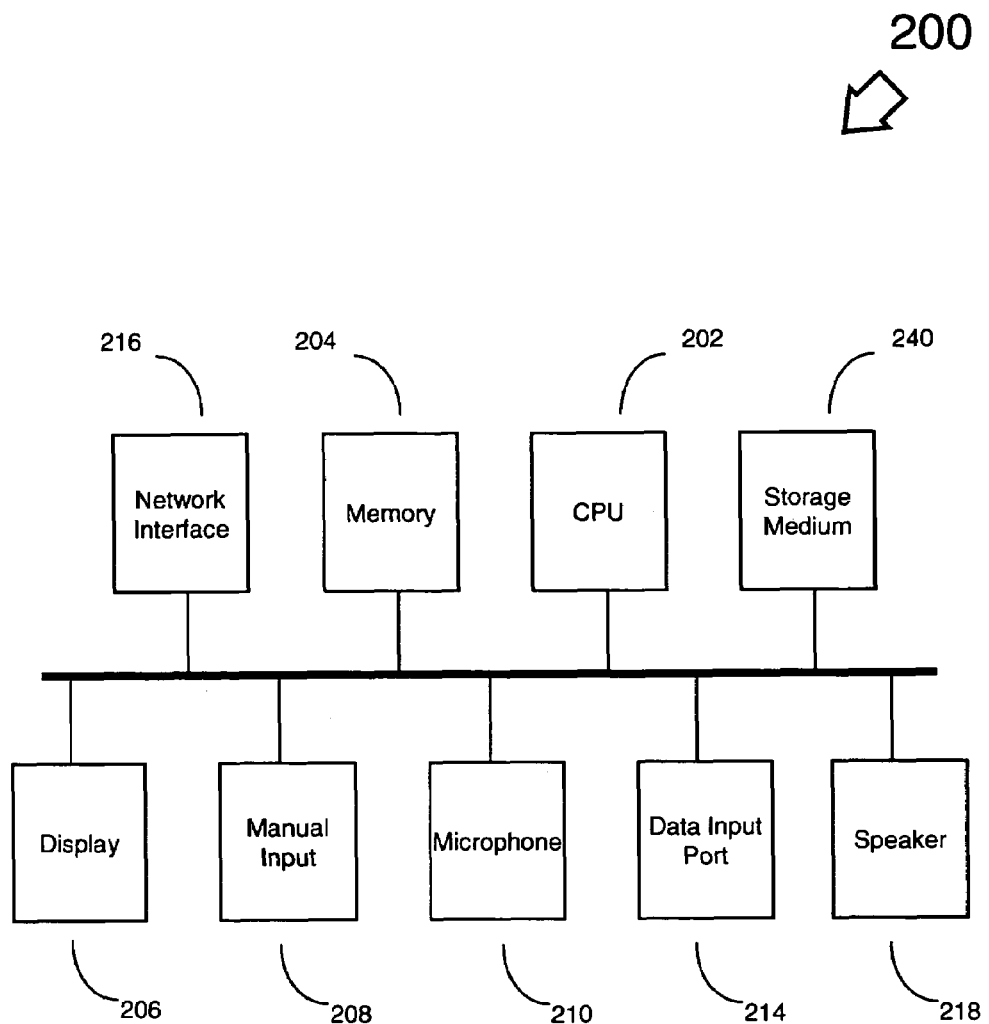
FIG. 2 is an act diagram of an apparatus configured to measure the hardware cost of adding complex instructions to a microprocessor.

Embodiments will now be disclosed with reference to a functional act diagram of an exemplary hardware cost estimator 200 of FIG. 2, constructed and operative in accordance with an embodiment of the present invention. For illustrative purposes only, the hardware cost estimator embodiment presented below describes an embodiment used with standard cell design. However, it is readily apparent by those known in the art, that embodiments may be extended to the use of Field Programmable Gate Arrays (FPGAs), structured ASICs, or use of tiling-based data path generators. It is understood that one aspect of the present invention is to characterize parameterized primitives and use a cost database to predict the cost of subsystems based on their structure.

Hardware cost estimator 200 is an apparatus configured to measure the hardware cost of adding complex instructions to a microprocessor, and may run a real-time multi-tasking operating system (OS) and include at least one processor or central processing unit (CPU) 202. Processor 202 may be any microprocessor or micro-controller as is known in the art.

The software for programming the processor 202 may be found at a computer-readable storage medium 240 or, alternatively, from another location across a computer network. Processor 202 is connected to computer memory 204. Hardware cost estimator 200 may be controlled by an operating system that is executed within computer memory 204.

Processor 202 communicates with a plurality of peripheral equipment, including network interface 216. Additional peripheral equipment may include a display 206, manual input device 208, storage medium 240, microphone 210, and data port 214.

Display 206 may be a visual display such as a cathode ray tube (CRT) monitor, a liquid crystal display (LCD) screen, flat-panel display, touch-sensitive screen, or other monitors as are known in the art for visually displaying images and text to a user.

Manual input device 208 may be a conventional keyboard, keypad, mouse, trackball, joystick, light pen, areas of a touch-sensitive screen or other input device as is known in the art for the manual input of data.

Storage medium 240 may be a conventional read/write memory such as a magnetic disk drive, floppy disk drive, compact-disk read-only-memory (CD-ROM) drive, digital versatile disk (DVD) drive, flash memory, memory stick, transistor-based memory or other computer-readable memory device as is known in the art for storing and retrieving data. Significantly, storage medium 240 may be remotely located from processor 202, and be connected to processor 202 via a network such as a local area network (LAN), a wide area network (WAN), or the Internet.

Microphone 210 may be any suitable microphone as is known in the art for providing audio signals to processor 202. In addition, a speaker 218 may be attached for reproducing audio signals from processor 202. It is understood that microphone 210, speaker 218, and data port 214 may include appropriate digital-to-analog and analog-to-digital conversion circuitry as appropriate.

Data port 214 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 214 may be any interface as known in the art for communicating or transferring files across a computer network, examples of such networks include Transmission Control Protocol/Internet Protocol (TCP/IP), Ethernet, Fiber Distributed Data Interface (FDDI), token bus, or token ring networks. In addition, on some systems, data port 214 may consist of a modem connected to network interface 216. Similarly, in some embodiments network interface 216 provides connectivity to hardware cost estimator 200 to communicate with a network. Thus, the network interface 216 allows the hardware cost estimator 200 to communicate and process input and output from across a network.

Figure 3:
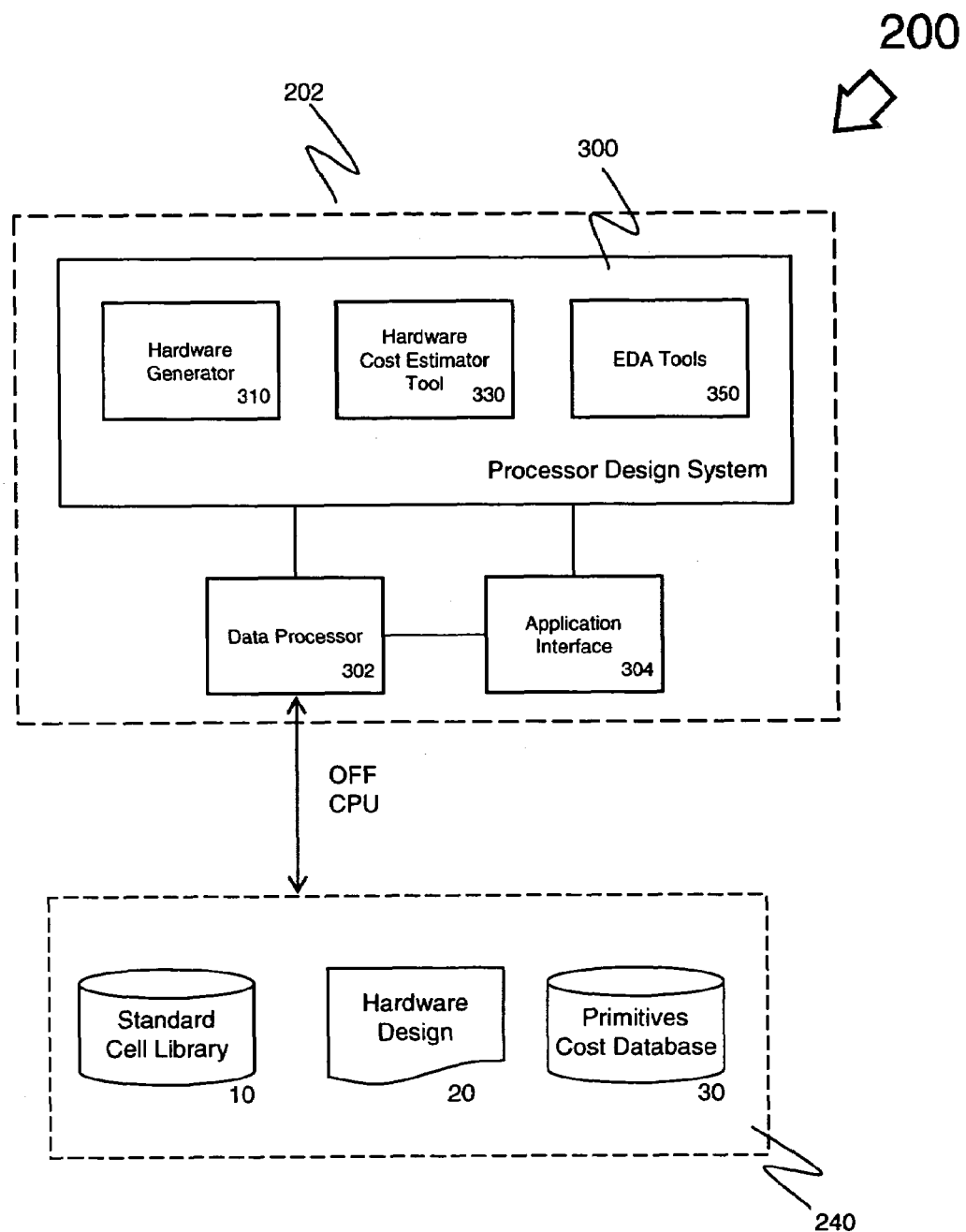
FIG. 3 is an act diagram of an apparatus that measure the hardware cost of adding complex instructions to a microprocessor.

FIG. 3 is an expanded functional act diagram of CPU 202 and storage medium 240, constructed and operative in accordance with an embodiment of the present invention. It is well understood by those in the art, that the functional elements of FIG. 3 may be implemented in hardware, firmware, or as software instructions and data encoded on a computer-readable storage medium 240. Computer-readable storage medium 240 may contain elements such as standard cell library 10, hardware design 20 and primitives cost database 30.

Data processor 302 interfaces with display 206, manual input device 208, storage medium 240, microphone 210, data port 214, and network interface 216. The data processor 302 enables processor 202 to locate data on, read data from, and write data to, these components.

Application interface 304 enables processor 202 to take some action with respect to a separate software application or entity. For example, application interface 304 may take the form of a windowing call recipient interface, as is commonly known in the art.

Processor design system 300 may be a window-interfaced microprocessor design program. In some embodiments, the processor design system 300 may be stand-alone program, or a series of programs working together or in concert. Processor Design System 300 comprises hardware generator 310, hardware cost estimator tool 330, and electronic design automation (EDA) tools 350. Hardware generator 310 may be any program, device, system or computer generates register-transfer level hardware descriptions that decode and execute new instructions, as is known in the art. Electronic design automation tools 350 are any tools known in the art that perform logical and/or physical design of a register-transfer description to implement the hardware in a standard cells-based integrated circuit. Hardware cost estimator tool 330 may best be understood with respect to the flowchart of FIGS. 4-6, as described below.

Figure 4:
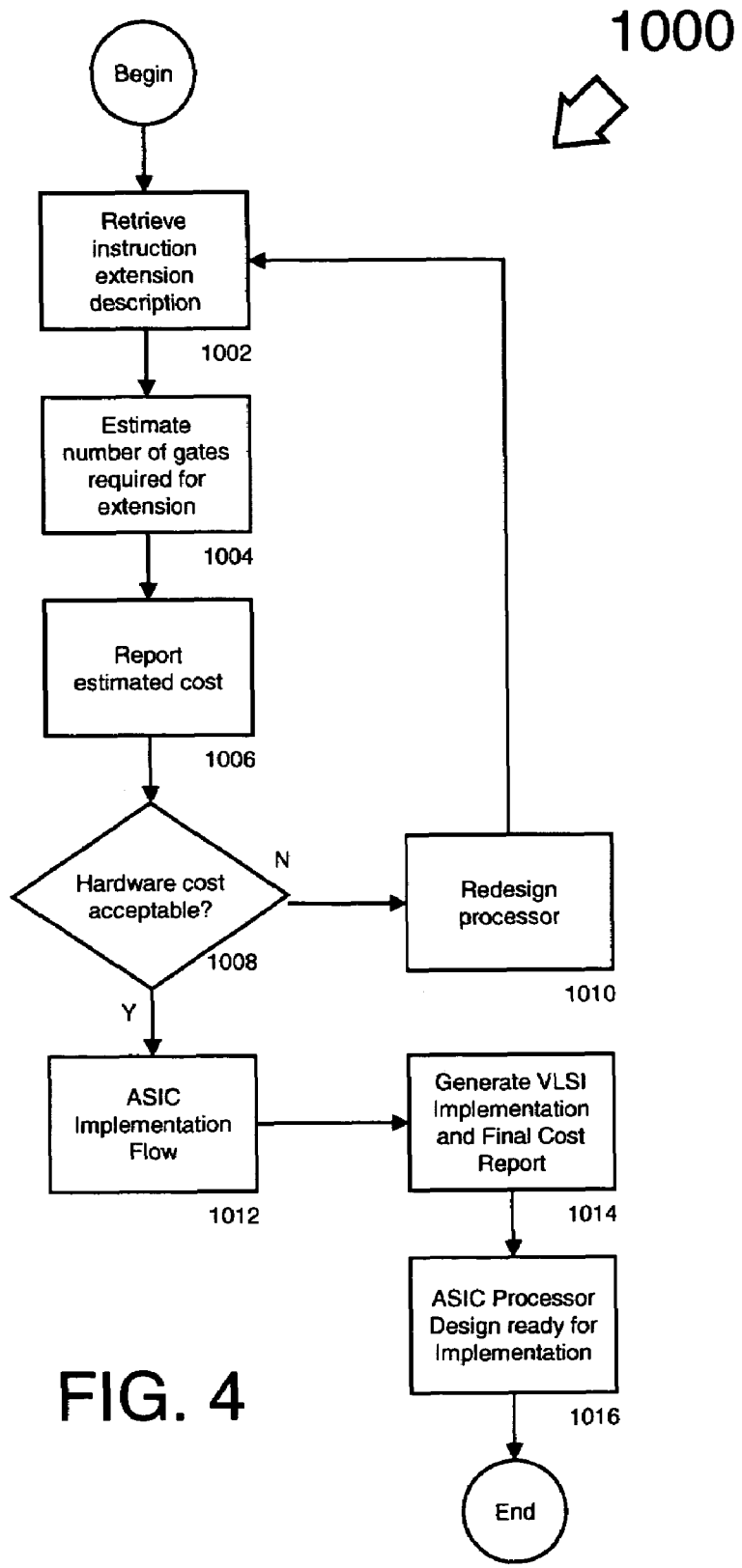
FIG. 4 is a flow chart of a method to measure the hardware cost of adding complex instructions to a microprocessor.

FIG. 4 flowcharts process 1000, a method to measure the hardware cost of adding complex instructions to a microprocessor, constructed and operative in accordance with an embodiment of the present invention.

At act 1002, process 1000 receives a description of the new design extension as customized instructions. For example, hardware generator 310 may create a register-transfer level hardware description to be received by process 1000. Such a description may be created by any means known in the art. The hardware cost estimator tool 330 receives the design extensions, and estimates the number of gates required for the design extension, act 1004. Hardware cost estimator tool 330 may then create a report that provides details of component costs of configurable hardware corresponding to new instructions, act 1006. The system architect uses the hardware cost report to perform architectural trade-off analysis, act 1008. If the resulting hardware cost is not acceptable, the processor is redesigned, act 1010. If the hardware cost is acceptable, the lengthy process of implementing the generated hardware using standard cell library and EDA tools is performed, act 1012. The percentage error between estimated cost and the final cost of the implemented design is small enough so that architectural level abstraction for an application specific processor is meaningful. Thus, EDA tools may be used to generate the VLSI implementation and final cost report, act 1014, so that the ASIC design may be made ready for implementation, act 1016.

Cost Characterization of Parameterized Building Blocks

Figure 5:
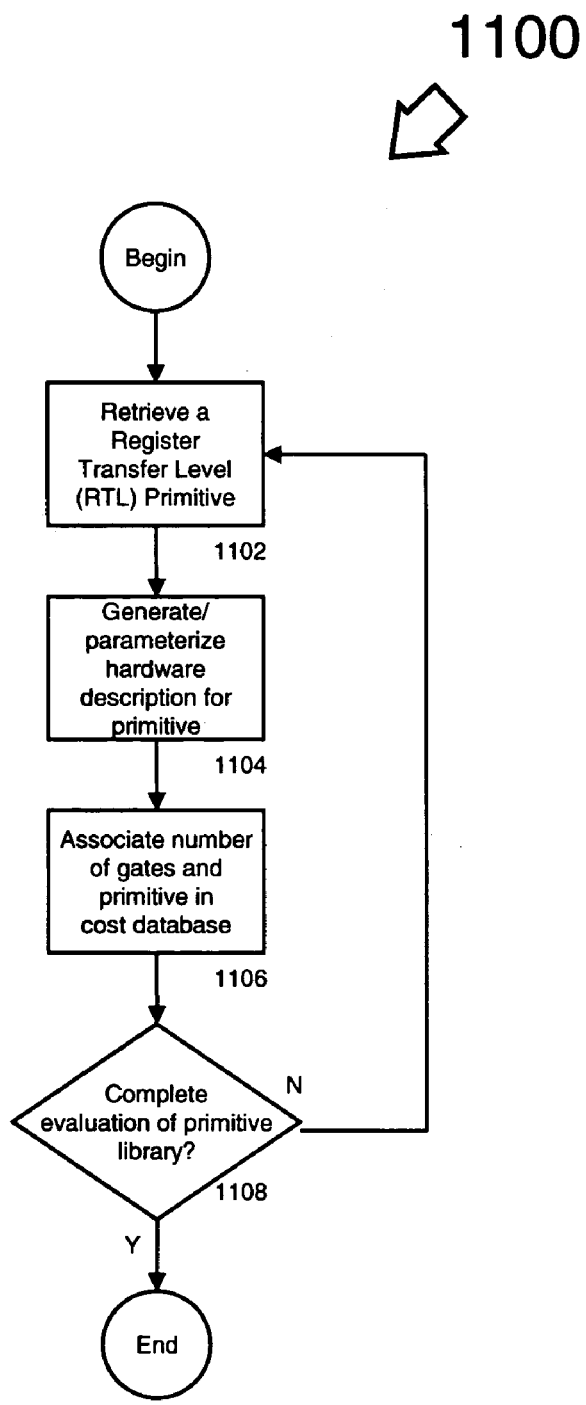
FIG. 5 is a flow chart of a method of measuring the hardware cost of adding a primitive library, as part of measuring the hardware cost of adding complex instructions to a microprocessor.

To achieve high accuracy, the estimator tool relies on accurately characterizing the hardware costs of building blocks. In the following, we use the term primitive and building block interchangeably. FIG. 5 is a flow chart of process 1100, a method of measuring the hardware cost of adding a primitive library, as part of measuring the hardware cost of adding complex instructions to a microprocessor, constructed and operative in accordance with an embodiment of the present invention. A register transfer level (RTL) primitive or "hardware building block" is retrieved from a library of primitives, act 1102, and is mapped to a set of standard cells using EDA tools 350, act 1104.

Figure 6:
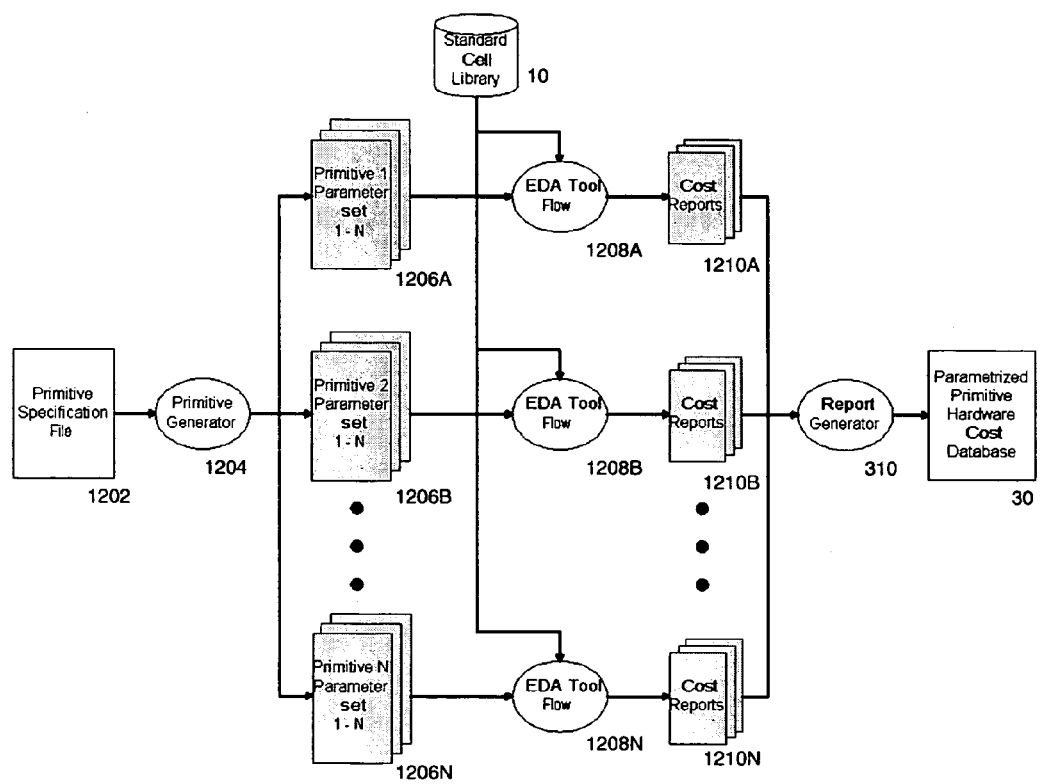
FIG. 6 is block diagram illustrating automatic generation of hardware cost database for a set of parameterized building blocks.

The process of generating parameterized primitive hardware cost database may be illustrated with in FIG. 6, constructed and operative in accordance with an embodiment of the present invention.

The types of hardware building blocks used are as follows:

Basic: binary encoded multiplexors, priority encoded multiplexors, 1-hot multiplexors, address decoders, comparators.

Arithmetic: adders, subtractors, multiplier, multiply-accumulate (MAC) units, shifters, and rotators.

Logical: bitwise or reduction versions of AND, OR, XOR, NAND, NOR, XNOR.

Storage: flip-flops, enable flops, latches, enable latches.

The flexibility to generate application-specific hardware description suggests that these building blocks are parameterizable. For example, a given type of multiplexor will select as an output one of an arbitrary number of inputs, all of which may be of arbitrary size (A 16:1 multiplexor where each of 16 inputs may be 8-bits wide). A specification file 1202 lists each primitive, its parameters 1206, and allowed values for each of the parameters. A primitive generator 1204 generates a hardware description for each primitive for each valid combination of its parameter values 1206 through an EDA Tool flow 1208. As mentioned above, the hardware description is characterized to generate a cost report 1210. The cost reports 1210 are consolidated via a report generator 310 into a parameterized primitives cost database 30.

For certain primitives, the number of parameters 1206 and range of allowed values for each parameter leads to combinatorial explosion. To cope with combinatorial complexity, a primitive may be characterized only on a subset of allowed values for each of its parameters 1206. The hardware cost for a missing combination of parameter values 1206 is interpolated as part of the primitive database generator, and process 1106 ends. The final database has actual observed data, and may include any interpolation that occurs when the tool is running.

Returning to FIG. 5, the process is restarted until the entire primitive library is evaluated, act 1108.

Architecture of Hardware Cost Estimator

Figure 7:
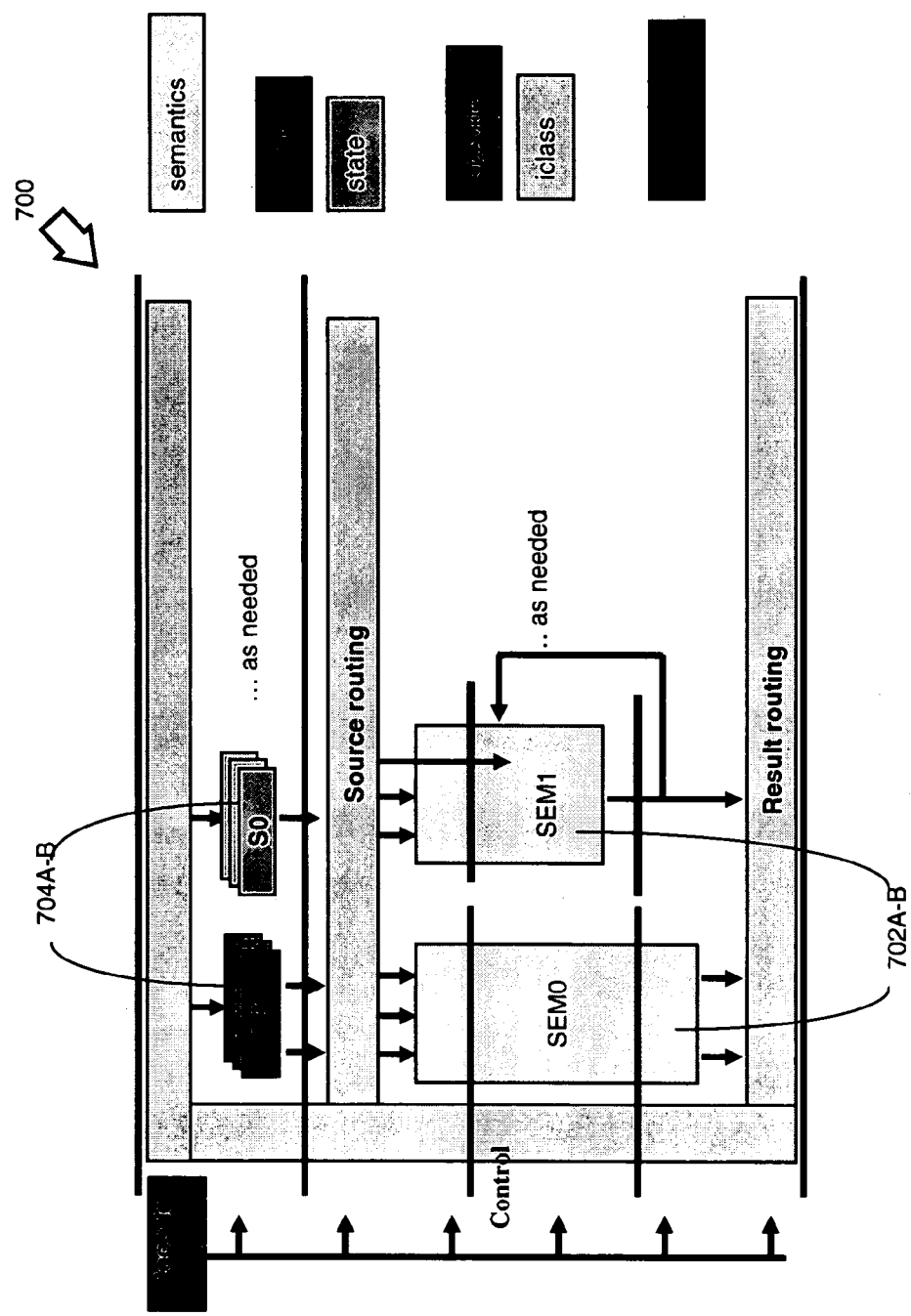
FIG. 7 is a block diagram the structure of hardware embodiment that represents an instruction extension logic.

The architecture of the hardware cost estimator depends on the underlying hardware architecture. In the one embodiment, the underlying hardware architecture is generated automatically. FIG. 7 depicts the structure of hardware that represents the instruction extension logic 700, constructed and operative in accordance with an embodiment of the present invention. The instruction extension logic 700 is broadly divided into three parts. First, the configurable execution units 702 are the main computation units that perform the operations for newly added instructions. The execution units 702 are labeled as SEM0 and SEM1 as a short name for semantics. Second, the storage units 704 are used as either a source or a destination operand by a newly added instruction. The storage units 704 are labeled as RF0 (704A) and S0 (704B) as short names for register file and state respectively. Finally, the remainder of the logic is responsible for decoding the instruction, controlling the pipeline, and routing the data (to or from storage units or memory interfaces). The details of instruction extension specification syntax may be found in A. Wang et al., "Hardware/Software Instruction Set Configurability for System-on-Chip Processors" in the proceedings of Design Automation Conference, 2001.

Figure 8:
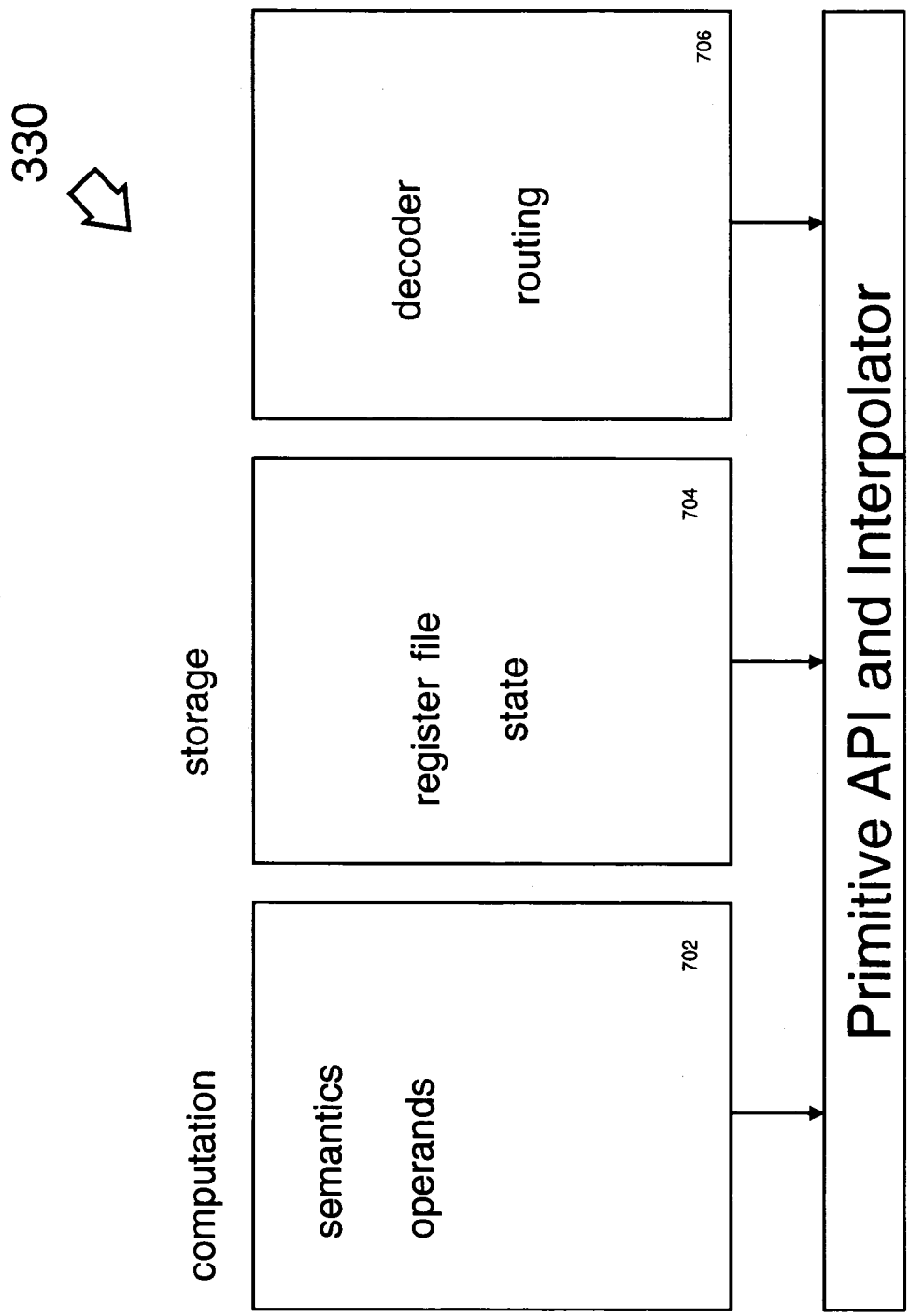
FIG. 8 depicts an alternate embodiment of the hardware cost estimator.

An alternate embodiment of the hardware cost estimator 330 is shown in FIG. 8, constructed and operative in accordance with an embodiment of the present invention. Such an embodiment comprises three major parts configured to calculate hardware cost: computation units 702, storage units 704, and decoder/control/routing units 806. Each of these units may be made of sub-units, which are ultimately implemented by parameterized hardware primitives described above. The estimator 330 makes function calls to estimate the hardware cost of each unit, which ultimately invoke the functional interface for calculating the cost of a parameterized hardware primitive for specific parameter values. The primitive cost calculation routines look into the primitives cost database and invoke the interpolation engine if required.

The use of parameterized primitives provide the necessary abstraction layer that enables very fast calculation of hardware cost while retaining accuracy as the cost of each parameterized primitive is based on the use of an existing standard cell library 10 and EDA tools 350.

Modeling Computation Units

The data path of the instruction extension logic comprises computation units 702, each of which may implement computation corresponding to one or multiple instructions. Conceptually, each computation unit 702 is represented by a data flow graph, where each node is an assignment and directed edge from node A to node B indicates that the output of assignment A is an input of assignment B. The cost of a computation unit 702 is equal to the sum of the cost of each assignment node. The cost of an assignment is equal to the cost of the right hand side expression that computes the value to be assigned. The expression is represented as a tree structure, where each leaf node is an input variable and each intermediate node is an operator. A sub-expression corresponds to the sub-tree rooted at each intermediate node. If the hardware cost of each sub-expression is stored at the corresponding intermediate node, the cost of the assignment is computed by bottom up traversal of the expression tree.

The use of constants in hardware description simplifies the amount of logic. Hence, it reduces the hardware cost. For data flow graph representation, it is possible to simplify the underlying assignments and expressions by propagating the constants from inputs of the data flow graph to the outputs.

For each computation unit 702, the pipeline stage in which each primary input signal is used and each primary output signal is required depends on the number of cycles available for the computation unit to perform its computation. To meet the pipeline schedule requirements, staging or pipeline flops are inserted in the data path. The hardware cost estimator accounts for the cost of pipeline flops as it may be a nontrivial fraction of the total cost.

Modeling Storage Cost

The register file and state are storage units 704 in a processor. The user simply specifies the register file requirements by providing information about the number of entries, size of each entry, number of banks, and implementation choice for the storage element. The hardware generator 330 automatically generates the required structures so as to meet the user specifications while managing the requirements to implement the pipeline. A register file generator capability enables the user to make very simple changes to create vastly different register files. However, this necessitates that the hardware cost estimator 330 models the register file accurately.

Figure 9A:
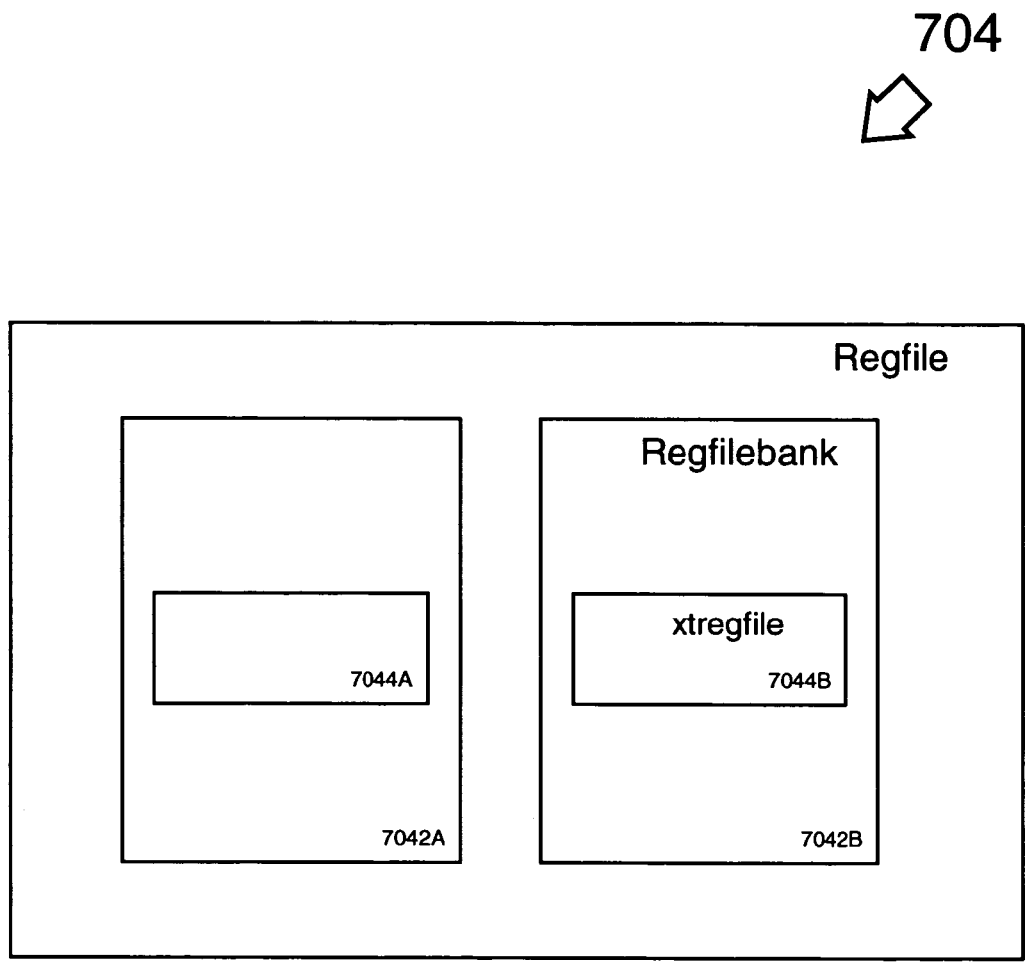
FIG. 9A shows one embodiment for a parameterized register file.

FIG. 9A shows one embodiment for a parameterized register file 704, constructed and operative in accordance with an embodiment of the present invention. The register file 704A comprises of one or multiple (power of 2) banks 7042A-B. One aspect of a banked register file is that it allows flexibility in terms of the size of data words that are read from or written to the register file. For example, a 2-bank register file with each bank made of 16 words, each of which is 32-bits may be viewed as follows:

1. A register file with 32 words, each of which is 32-bits.
2. A register file with 16 words, each of which is 64-bits.

Each register file bank 7042 contains logic for forwarding the result, a mechanism to avoid data hazards, and a mechanism to generate stall logic if a result to be read is not available in the pipeline. The core 7044 of each register file bank consists of the architectural registers that correspond to the register values expected by the software program.

Figure 9B:
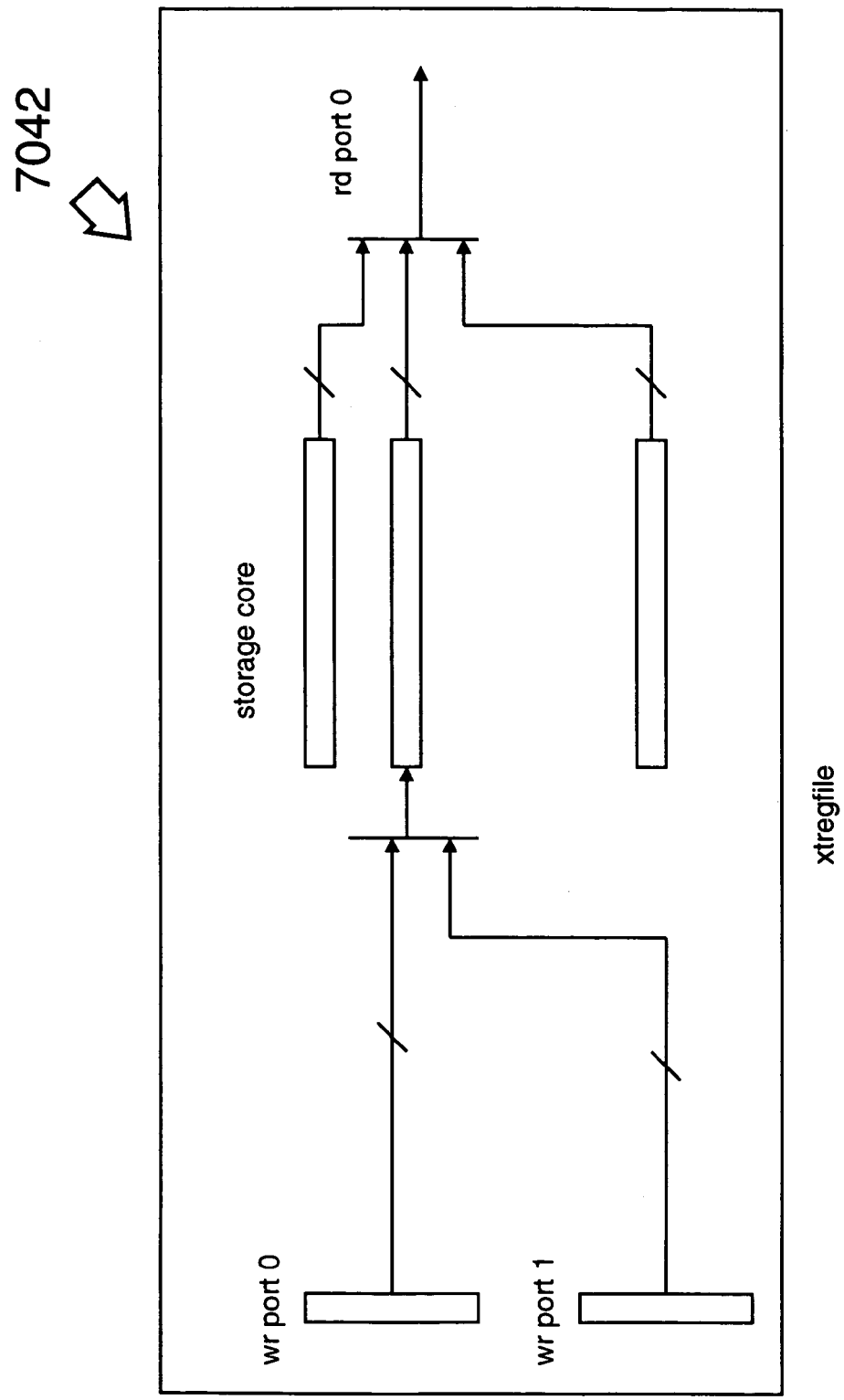
FIG. 9B depicts the core of a register file bank (reg-core) embodiment.

The core of a register file bank (reg-core) 7044 is shown in FIG. 9B, constructed and operative in accordance with an embodiment of the present invention. The register file core 7044 comprises of a configurable number of storage logic, write port logic, and read port logic. The storage logic may be implemented using different implementation options, as is known in the art. The storage elements may be either latches or flops, or any other storage elements known in the art. The control signal may either be an enable signal on the storage element or a gated clock. Hence, four possible choices in which the storage core may be implemented are as follows:

1. Latches with gated clocks;
2. Latches with enable signal;
3. Flops with gated clocks; and
4. Flops with enable signal.

The choices have a wide variation in the cost of the hardware. The EDA flow requirement may dictate the choice of register file storage core implementation. The estimator accurately takes the choice into account by choosing an appropriate storage primitive. The reg-core 7044 may have one or more write ports. The cost of write logic is a non-linear function of the number of write ports. Each read port on the reg-core is a multiplexor that selects the data from one of the register file storage core entries.

The register file core 7044 may also be implemented using custom circuitry. The approach to estimation remains the same. In case of custom circuitry, the number of read ports and the number of write ports become parameters in addition to the number of entries and the size of each entry.

Figure 9C:
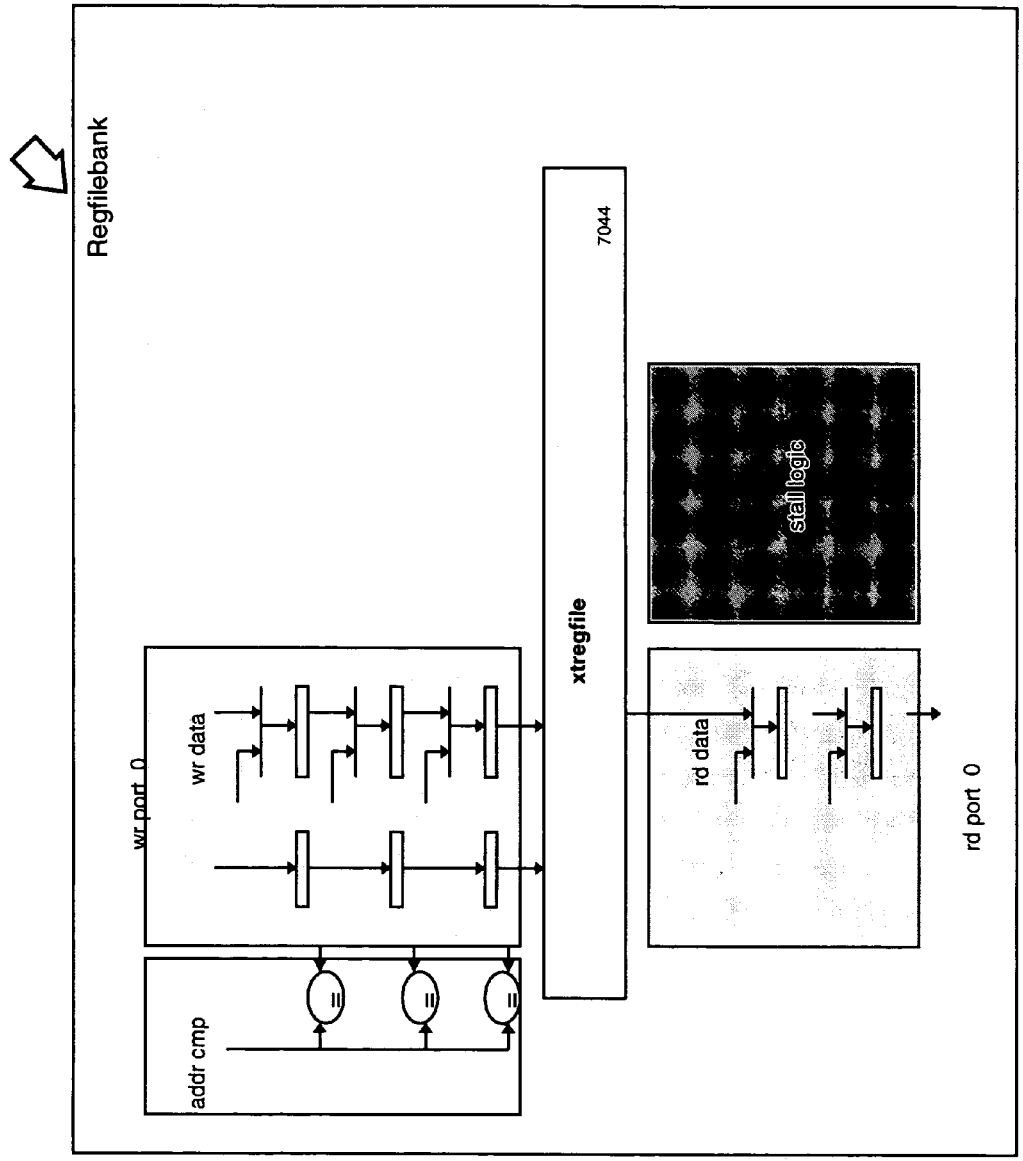
FIG. 9C is a block diagram of a hardware constructs in a register file bank embodiment.

Each register file bank 7042 may implement the necessary hardware constructs to retain the sequential program order view. The hardware constructs in a register file bank 7042 are illustrated in FIG. 9C, constructed and operative in accordance with an embodiment of the present invention. Firstly, the register file bank 7042 may ensure that data written to the reg-core meets the sequential program model. A younger instruction writing to the same word in the register file as an older instruction is able to do so even if the result for the older instruction may be produced after the results produced by the younger instruction in the processor pipeline. Alternatively stated, it may ensure that processor avoids write-after-write hazards. Secondly, the register file bank 7042 may bypass or forward the data that is still not committed to the architectural state so that the pipeline can continue functioning efficiently. Finally, the register file bank 7042 may stall the pipeline until the data required by an instruction becomes available.

Figure 9D:
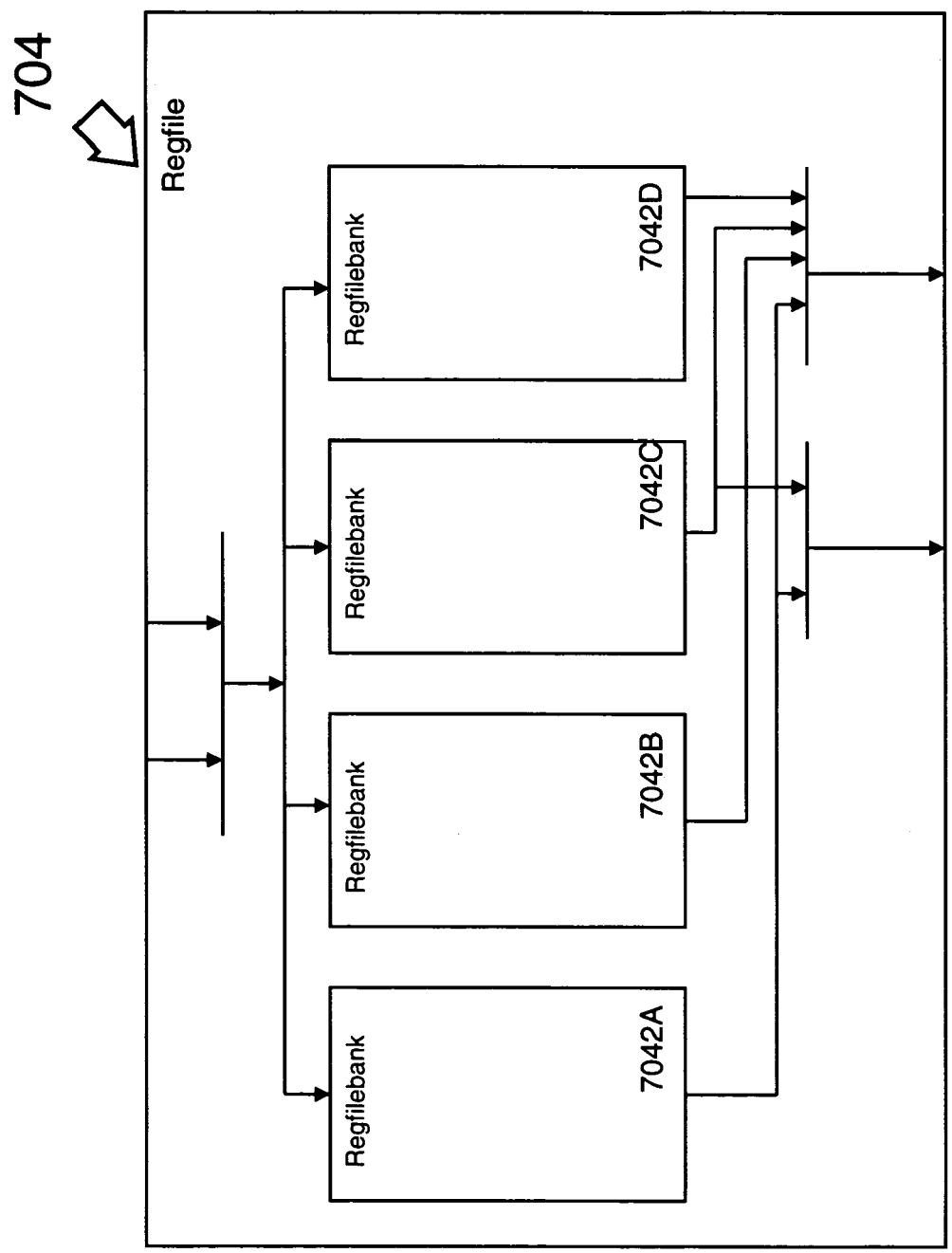
FIG. 9D illustrates a multiplexor logic embodiment in a banked register file.

The register file module may implement the necessary multiplexor control logic so as to implement the banking structure. The multiplexor logic is illustrated in FIG. 9D, constructed and operative in accordance with an embodiment of the present invention.

A state is similar to a register file in that a state is a special register file with only one read port and only one write port. This enables a certain amount of optimization in the logic description. The hardware cost estimator takes this optimization into account to compute the cost of implementing a state of a given size.

Modeling Decoder, Muxing, and Pipeline Control

The decoder cost estimation follows closely the expressions used to generate the decoding logic. The decoder has logic structures that are amenable to sharing and constant propagation. The empirical scale factors are used to deflate the area obtained by simple summation of logic expressions used by the decoder.

The data from register files, states, and memory interfaces is sourced to computation units. The outputs from computation units that are either written to a register file, a state, or memory interface may be multiplexed together. The estimator accounts for these overhead costs.

In addition, the estimator accounts for the logic required to control and manage the pipeline.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An hardware cost estimator apparatus, comprising:
a data processor configured to receive an user-defined instruction extension description, wherein the user-defined instruction extension description corresponds to a new instruction for execution by a processor;
a hardware cost estimating tool configured to estimate a number of gates required for the instruction extension described by the user-defined instruction extension description, wherein the required number of gates correspond to components needed by the processor to execute the new instruction, configured to approximate a hardware cost of the gates required for the instruction extension, and configured to approximate a hardware cost of the instruction extension through the hardware cost of the gates; and
a database for storing number of gates associated with a plurality of processor components, wherein the hardware cost estimating tool uses the stored numbers in the database to estimate the required number of gates for the instruction extension.

2. The apparatus of claim 1, wherein the hardware cost of the gates is approximated by associating a predetermined cost of the gates from a hardware cost database.

3. The apparatus of claim 2, wherein the hardware cost of the instruction extension is approximated by summing the hardware cost of the gates.

4. The apparatus of claim 3, further comprising:
an application interface configured to report the hardware cost of the instruction extension.

5. The apparatus of claim 4, wherein the hardware cost is measured by the area of the gate.

6. The apparatus of claim 1, wherein the user-defined instruction extension description comprises a register transfer level hardware description.

7. The apparatus of claim 1, wherein the needed components include execution units that perform operations for the new instruction, storage units used by operands of the new instruction, and logic for decoding the new instruction.

8. The apparatus of claim 1, wherein the database stores numbers of gates associated with a plurality of parameterized versions of a processor component, and wherein at least one of the needed components is compared to the versions of the processor component stored in the database to determine the number of gates of the at least one needed component.

9. A method of operating hardware cost estimator, comprising:
receiving an user-defined instruction extension description, wherein the user-defined instruction extension description corresponds to a new instruction for execution by a processor;
storing number of gates associated with a plurality of processor components;
estimating a number of gates required for the instruction extension described by the user-defined instruction extension description, wherein the required number of gates correspond to components needed by the processor to execute the new instruction, and wherein the stored numbers are used to estimate the required number of gates for the instruction extension;
approximating a hardware cost of the gates required for the instruction extension;
approximating a hardware cost of the instruction extension through the hardware cost of the gates.

10. The method of claim 9, wherein the hardware cost of the gates is approximated by associating a predetermined cost of the gates from a hardware cost database.

11. The method of claim 10, wherein the hardware cost of the instruction extension is approximated by summing the hardware cost of the gates.

12. The method of claim 11, further comprising:
reporting the hardware cost of the instruction extension.

13. The method of claim 12, wherein the hardware cost is measured by the area of the gate.

14. The method of claim 9, wherein the user-defined instruction extension description comprises a register transfer level hardware description.

15. The method of claim 9, wherein the needed components include execution units that perform operations for the new instruction, storage units used by operands of the new instruction, and logic for decoding the new instruction.

16. The method of claim 9, further comprising:
storing numbers of gates associated with a plurality of parameterized versions of a processor component in a database; and
comparing at least one of the needed components to the versions of the processor component stored in the database to determine the number of gates of the at least one needed component.

17. An hardware cost estimator apparatus, comprising:
means for receiving an user-defined instruction extension description, wherein user-defined instruction extension description corresponds to a new instruction for execution by a processor;
means for estimating a number of gates required for the instruction extension described by the user-defined instruction extension description, wherein the required number of gates correspond to components needed by the processor to execute the new instruction;
means for approximating a hardware cost of the gates required for the instruction extension;
means for approximating a hardware cost of the instruction extension through the hardware cost of the gates; and
means for storing number of gates associated with a plurality of processor components, wherein the means for estimating uses the stored numbers to estimate the required number of gates for the instruction extension.

18. The apparatus of claim 17, wherein the hardware cost of the gates is approximated by associating a predetermined cost of the gates from a hardware cost database.

19. The apparatus of claim 18, wherein the hardware cost of the instruction extension is approximated by summing the hardware cost of the gates.

20. The apparatus of claim 19, further comprising:
means for reporting the hardware cost of the instruction extension.

21. The apparatus of claim 20, wherein the hardware cost is measured by the area of the gate.

22. A computer-readable medium, encoded with data and instructions, such that when executed by a computer, the instructions causes the computer to:

receive an user-defined instruction extension description, wherein the user-defined instruction extension description corresponds to a new instruction for execution by a processor;

store number of gates associated with a plurality of processor component;

estimate a number of gates required for the instruction extension described by the user-defined instruction extension description, wherein the required number of gates correspond to components needed by the processor to execute the new instruction, and wherein the stored numbers are used to estimate the required number of gates for the instruction extension;

approximate a hardware cost of the gates required for the instruction extension;

approximate a hardware cost of the instruction extension through the hardware cost of the gates.

23. The computer-readable medium of claim 22, wherein the hardware cost of the gates is approximated by associating a predetermined cost of the gates from a hardware cost database.

24. The computer-readable medium of claim 23, wherein the hardware cost of the instruction extension is approximated by summing the hardware cost of the gates.

25. The computer-readable medium of claim 24, wherein the instructions further cause the computer to:

report the hardware cost of the instruction extension.

26. The computer-readable medium of claim 25, wherein the hardware cost is measured by the area of the gate.

* * * * *